United States Patent
Hayashi et al.

(10) Patent No.: US 10,155,844 B2
(45) Date of Patent: Dec. 18, 2018

(54) POLYCARBONATES, POLYURETHANES, ELASTOMERS, PROCESSES FOR MANUFACTURING POLYCARBONATES AND PROCESSES FOR MANUFACTURING POLYURETHANES

(71) Applicant: Mitsubishi Gas Chemical Company, Inc., Chiyoda-ku (JP)

(72) Inventors: Takeo Hayashi, Niigata (JP); Hideyuki Sato, Niigata (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 4 days.

(21) Appl. No.: 15/321,859

(22) PCT Filed: Jul. 2, 2015

(86) PCT No.: PCT/JP2015/069103
§ 371 (c)(1),
(2) Date: Dec. 23, 2016

(87) PCT Pub. No.: WO2016/002873
PCT Pub. Date: Jan. 7, 2016

(65) Prior Publication Data
US 2017/0145158 A1    May 25, 2017

(30) Foreign Application Priority Data

Jul. 2, 2014   (JP) ................. 2014-136691

(51) Int. Cl.
| | |
|---|---|
| C08G 64/02 | (2006.01) |
| C08G 18/44 | (2006.01) |
| C08G 18/10 | (2006.01) |
| C08G 64/18 | (2006.01) |
| C08G 64/30 | (2006.01) |
| C08G 64/42 | (2006.01) |
| C08G 18/76 | (2006.01) |

(52) U.S. Cl.
CPC ........ *C08G 64/0208* (2013.01); *C08G 18/10* (2013.01); *C08G 18/44* (2013.01); *C08G 18/7671* (2013.01); *C08G 64/02* (2013.01); *C08G 64/18* (2013.01); *C08G 64/30* (2013.01); *C08G 64/42* (2013.01)

(58) Field of Classification Search
CPC ............................ C08G 18/44; C08G 64/0208
See application file for complete search history.

(56) References Cited

U.S. PATENT DOCUMENTS

| | | |
|---|---|---|
| 2003/0136948 A1 | 7/2003 | Welch et al. |
| 2003/0143404 A1 | 7/2003 | Welch et al. |
| 2015/0329454 A1 | 11/2015 | Okamoto et al. |

FOREIGN PATENT DOCUMENTS

| | | | |
|---|---|---|---|
| JP | 07224290 | * | 8/1995 |
| JP | 2005-507970 A | | 3/2005 |
| JP | 2013-209492 A | | 10/2013 |
| JP | 2014-62202 A | | 4/2014 |
| JP | 2014062202 | * | 4/2014 |
| WO | WO 2014/104341 A1 | | 7/2014 |

OTHER PUBLICATIONS

International Search Report dated Sep. 29, 2015 in PCT/JP2015/069103 (submitting English language translation only).
International Preliminary Report on Patentability and Written Opinion dated Jan. 12, 2017 in PCT/JP2015/069103 (with English language translation).
Katsuji Matsunaga, "Chemistry and Latest Applied Technology of Polyurethanes" CMC Publishing Co., Ltd., Dec. 2011, pp. 14-26 (with English Translation).

* cited by examiner

*Primary Examiner* — David J Buttner
(74) *Attorney, Agent, or Firm* — Oblon, McClelland, Maier & Neustadt, L.L.P.

(57) ABSTRACT

Provided is a polycarbonates that can be used as starting materials for polyurethanes having excellent weather resistance and heat aging resistance. Provided is polyurethanes and elastomers obtained by using the polycarbonates, as well as processes for manufacturing the polycarbonates and processes for manufacturing the polyurethanes. The polycarbonate contains one or more types of repeating unit represented by formula [I] below, which contains 90% or more of terminal hydroxyl groups; wherein $R^1$, $R^2$, $R^3$ and $R^4$ each independently represent an aliphatic hydrocarbon group containing 1 to 6 carbon atoms.

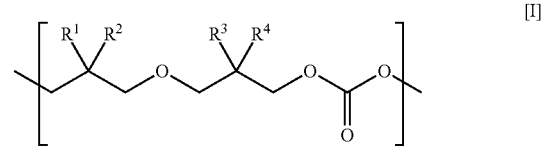

21 Claims, No Drawings

POLYCARBONATES, POLYURETHANES, ELASTOMERS, PROCESSES FOR MANUFACTURING POLYCARBONATES AND PROCESSES FOR MANUFACTURING POLYURETHANES

TECHNICAL FIELD

The present invention relates to novel polycarbonates, more specifically it relates to novel polycarbonates that can be used as starting materials for polyurethanes having excellent weather resistance, heat resistance (especially heat aging resistance), hydrolysis resistance, low temperature properties, cold resistance, flexibility and mechanical properties; as component materials of paints, adhesives, pressure-sensitive adhesives, inks, covering materials, encapsulants and the like; and as polymer modifiers, polymer plasticizers and the like.

BACKGROUND ART

Conventionally, polyesters or polyethers containing hydroxyl groups at the ends of the molecules have been mainly used as soft segments of polyurethanes such as thermoplastic elastomers.

Among them, polyesters represented by adipates are poor in hydrolysis resistance so that polyurethanes obtained by using them, for example, are susceptible to cracks or molds on the surfaces in a relatively short time and therefore, they are limited in their use. On the other hand, polyurethanes obtained by using polyethers have good hydrolysis resistance, but they are disadvantageously poor in weather resistance and heat resistance (especially heat aging resistance). Further, polyester-based thermoplastic elastomers and the like also had similar problems to those with the polyurethanes because of recent demanding requirements for heat resistance (especially heat aging resistance), weather resistance, hydrolysis resistance, mold resistance, oil resistance and the like.

To solve these problems, polycarbonates containing hydroxyl groups at the ends of the molecules are used as soft segments especially in applications requiring high physical properties such as hydrolysis resistance, weather resistance, heat resistance (especially heat aging resistance) and the like because carbonate bonds in their polymer chain are very stable (non-patent document 1).

On the other hand, patent document 1 discloses polycarbonate diols represented by formula (1) below, characterized in that they have a terminal primary OH content of 95 to 98.5%.

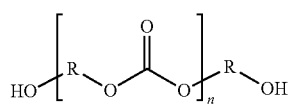

(1)

Further, patent document 2 discloses polycarbonate diol-containing compositions comprising a polycarbonate diol having a number average molecular weight of 250 or more and 5000 or less and a hydroxyl group content of 95 mol % or more relative to all terminal groups, a phosphorus compound, and a hindered phenol compound.

REFERENCES

Patent Documents

Patent document 1: JPA2013-209492
Patent document 2: JPA2014-62202

Non-Patent Documents

Non-patent document 1: "Chemistry and Latest Applied Technology of Polyurethanes", edited under the supervision of Katsuji MATSUNAGA, published by CMC Publishing Co., Ltd., December 2011, pp. 14-26

SUMMARY OF THE INVENTION

Problems to be Solved by the Invention

However, polyurethanes obtained by using common polycarbonates derived from 1,6-hexanediol as described in non-patent document 1 were not always sufficient in weather resistance, heat resistance, especially heat aging resistance in some applications.

On the other hand, patent document 1 describes the use of polycarbonate diols having a specific structure as starting materials for polyurethanes, but does not describe the polycarbonates disclosed herein. Further, patent document discusses nothing about weather resistance or heat resistance (especially heat aging resistance) of the polyurethanes.

Patent document 2 also describes polycarbonate diol-containing compositions having a specific structure, as well as the use of such polycarbonate diol-containing compositions as starting materials for polyurethanes. Patent document 2 somewhat resembles the present invention in Example 3, which uses neopentyl glycol as one of starting diol components. If neopentyl glycol is used as a diol component, however, carbonate compounds having a stable cyclic structure are generated and distilled off during polycondensation, as described in paragraph 0095 of patent document 2. The generation of such carbonate compounds having a cyclic structure invites a loss of starting diol components, which makes it difficult to obtain polycarbonates having desired molecular weight and copolymer composition. In addition, the loss of starting diol components is also disadvantageous for industrial production.

Thus, the present invention aims to provide polycarbonates that can be used as starting materials for polyurethanes having excellent weather resistance and heat resistance, especially heat aging resistance. It also aims to provide polyurethanes and elastomers obtained by using the polycarbonates, as well as processes for manufacturing the polycarbonates and processes for manufacturing the polyurethanes.

Means to Solve the Problems

As a result of our careful studies to achieve the objects described above, we found that polyurethanes having excellent weather resistance and heat resistance, especially heat aging resistance can be obtained by using polycarbonates containing a specific structural unit, and finally attained the present invention.

Specifically, the problems described above were solved by the following means <1>, preferably <2> to <24>.

<1> A polycarbonate comprising one or more types of repeating unit represented by formula [I] below, wherein 90% or more of a terminal group thereof is hydroxyl group;

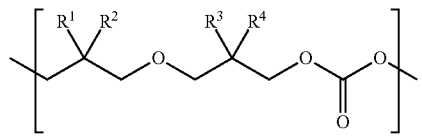

wherein $R^1$, $R^2$, $R^3$ and $R^4$ each independently represent an aliphatic hydrocarbon group containing 1 to 6 carbon atoms.

<2> The polycarbonate according to <1>, wherein, in the repeating unit represented by formula [I], a combination of $R^1$ and $R^2$ and a combination of $R^3$ and $R^4$ are different from each other.

<3> The polycarbonate according to <1> or <2>, wherein one or more types of the repeating unit represented by formula [I] is contained at a ratio of 20 mol % or more among all repeating units.

<4> The polycarbonate according to any one of <1> to <3>, having a number average molecular weight of 400 to 10000.

<5> The polycarbonate according to <4>, having a glass transition temperature of −30° C. or less as measured by differential scanning calorimetry.

<6> The polycarbonate according to any one of <1> to <5>, wherein one or more types of the repeating unit represented by formula [I] is contained at a ratio of 50 mol % or more among all repeating units.

<7> The polycarbonate according to any one of <1> to <6>, comprising one or more types of the repeating unit represented by formula [I] and a repeating unit represented by formula [II] below:

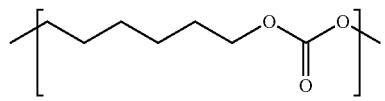

<8> The polycarbonate according to <7>, wherein one or more types of the repeating unit represented by formula [I] is contained at a ratio of 20 mol % or more among all repeating units; and the repeating unit represented by formula [II] is contained at a ratio of 20 mol % to 80 mol % among all repeating units.

<9> The polycarbonate according to <7> or <8>, having an exothermic melting peak temperature of 15° C. or less as measured by differential scanning calorimetry or having no exothermic melting peak observed.

<10> The polycarbonate according to any one of <1> to <9>, wherein $R^1$ and $R^2$ represent methyl group in formula [I].

<11> The polycarbonate according to <10>, wherein $R^3$ and $R^4$ represent methyl group in formula [I].

<12> The polycarbonate according to <10>, wherein at least one of $R^3$ and $R^4$ represents a group other than methyl group in formula [I].

<13> The polycarbonate according to any one of <3> to <6>, wherein the repeating unit of formula [I], wherein $R^1$, $R^2$, $R^3$ and $R^4$ represent methyl group, is contained at a ratio of mol % to 80 mol % among all repeating units; and the repeating unit of formula [I], wherein a combination of $R^1$ and $R^2$ and a combination of $R^3$ and $R^4$ are different from each other, is contained at a ratio of 20 mol % or more among all repeating units.

<14> The polycarbonate according to <13>, having an exothermic melting peak temperature of 15° C. or less as measured by differential scanning calorimetry or having no exothermic melting peak observed.

<15> A polyurethane obtained by using the polycarbonate according to any one of <1> to <14> as a starting material.

<16> An elastomer comprising the polyurethane according to <15>.

<17> A process for manufacturing a polycarbonate, comprising reacting a diol component containing one or more types of diol represented by formula [III] below with a carbonate diester;

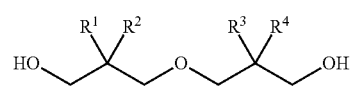

wherein $R^1$, $R^2$, $R^3$ and $R^4$ each independently represent an aliphatic hydrocarbon group containing 1 to 6 carbon atoms.

<18> The process for manufacturing a polycarbonate according to <17>, comprising reacting a diol component containing 20 mol % or more of one or more types of diol represented by the formula [III] among all diols and containing 20 mol % to 80 mol % of 1,6-hexanediol among all diols with a carbonate diester.

<19> A process for manufacturing a polyurethane, comprising reacting the polycarbonate according to any one of <1> to <14> with a polyisocyanate.

<20> The process for manufacturing a polyurethane according to <19>, comprising reacting the polycarbonate with a polyisocyanate to give a prepolymer, and reacting the prepolymer with a chain extender.

<21> A polyurethane comprising a repeating unit represented by formula [I] below:

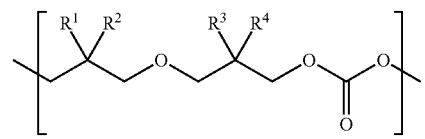

wherein $R^1$, $R^2$, $R^3$ and $R^4$ each independently represent an aliphatic hydrocarbon group containing 1 to 6 carbon atoms.

<22> The polyurethane as defined in <21>, comprising a repeating unit represented by formula [X] below:

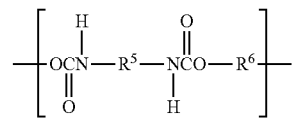

wherein $R^5$ represents a divalent hydrocarbon group, and $R^6$ contains the repeating unit represented by formula [I].

<23> The polyurethane as defined in <21>, comprising a repeating unit represented by formula [XX] below:

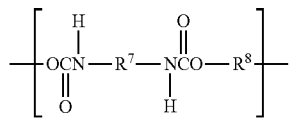 [XX]

wherein $R^7$ represents a divalent hydrocarbon group, and $R^8$ contains the repeating unit represented by formula [I] and a repeating unit represented by formula [II]:

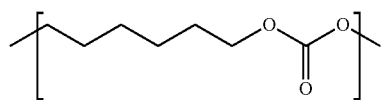 [II]

<24> The polyurethane as defined in <21>, comprising at least one of a repeating unit represented by formula [X] below and a repeating unit represented by formula [XX] below, as well as a repeating unit represented by formula [XXX] below:

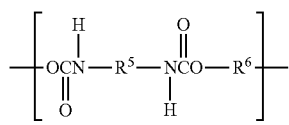 [X]

wherein $R^5$ represents a divalent hydrocarbon group, and $R^6$ contains the repeating unit represented by formula [I];

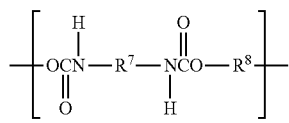 [XX]

wherein $R^7$ represents a divalent hydrocarbon group, and $R^8$ contains the repeating unit represented by formula [I] and a repeating unit represented by formula [II]:

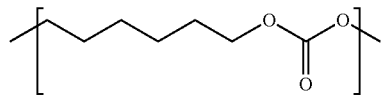 [II]

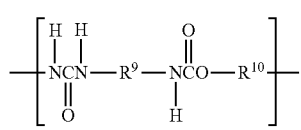 [XXX]

wherein $R^9$ represents a divalent hydrocarbon group, and $R^{10}$ has the same meaning as defined for $R^6$ in formula [X] or $R^8$ in formula [XX].

Advantages of the Invention

The present invention has great industrial significance in that polyurethanes having excellent weather resistance and heat resistance (especially heat aging resistance) can be obtained by using the polycarbonates of the present invention.

THE MOST PREFERRED EMBODIMENTS OF THE INVENTION

The present invention will be explained in detail below. As used herein, each numerical range expressed by two values on both sides of "to" is used to mean the range including the values indicated before and after "to" as lower and upper limits. As used herein, "Me" means methyl. The polycarbonates of the present invention are characterized in that they comprise one or more types of repeating unit represented by formula [I] above, whereby polyurethanes (thermoplastic polyurethanes) having excellent weather resistance and heat resistance (especially heat aging resistance) can be obtained.

The mechanism by which the weather resistance and heat resistance (especially heat aging resistance) of the polyurethanes could be improved may be explained by the fact that the repeating unit represented by formula [I] not only improves weather resistance by the stability of two quaternary carbon atoms present in the diol-derived moiety but also improves hydrolysis resistance by the hydrophobicity that the quaternary carbon atoms exert In formula [I] above, $R^1$, $R^2$, $R^3$ and $R^4$ each independently represent an aliphatic hydrocarbon group containing 1 to 6 carbon atoms, e.g., methyl group, ethyl group, n-propyl group, 1-methylethyl group (isopropyl group), n-butyl group, 1-methylpropyl group, 2-methylpropyl group, 1,1-dimethylethyl group (tert-butyl group), n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group (neopentyl group), n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, 1,1,2-trimethylpropyl group, 1,2,2-trimethylpropyl group, 1-ethyl-1-methylpropyl group, and 1-ethyl-2-methylpropyl group.

Among them, preferred are methyl group, ethyl group, n-propyl group, 1-methylethyl group (isopropyl group), n-butyl group, 1-methylpropyl group, 2-methylpropyl group, n-pentyl group, 1-methylbutyl group, 2-methylbutyl group, 3-methylbutyl group, 1-ethylpropyl group and n-hexyl group, more preferably methyl group, ethyl group, n-propyl group, n-butyl group, n-pentyl group and n-hexyl group.

In the repeating unit, $R^1$ and $R^2$ more preferably represent methyl, and $R^3$ and $R^4$ preferably represent a group selected from methyl group, ethyl group, n-propyl group, n-butyl group, n-pentyl group, or n-hexyl group.

In the repeating unit, $R^1$ and $R^2$ more preferably represent methyl group, and $R^3$ and $R^4$ preferably each independently represent a group selected from methyl group, ethyl group, n-propyl group, n-butyl group, n-pentyl group, or n-hexyl group. More preferably in the repeating unit, $R^3$ is methyl group or ethyl group and $R^4$ is a group selected from methyl group, ethyl group, n-propyl group and n-butyl group.

Particularly in the present invention, preferred examples include the following embodiments.

In a first embodiment of formula [I] of the present invention, all of $R^1$ to $R^4$ represent methyl group.

In a second embodiment of formula [I] of the present invention, $R^1$ and $R^2$ represent methyl group, $R^3$ represents ethyl group, and $R^4$ represents n-butyl group.

In a third embodiment of formula [I] of the present invention, $R^1$ and $R^2$ represent methyl group, and $R^3$ and $R^4$ represent ethyl group.

In a fourth embodiment of formula [I] of the present invention, all of $R^1$ to $R^3$ represent methyl group, and $R^4$ represents n-propyl group.

In the repeating unit represented by formula [I], the combination of $R^1$ and $R^2$ and the combination of $R^3$ and $R^4$ may be different from each other.

The present invention includes, for example, embodiments of formula [I] wherein $R^1$ and $R^2$ represent methyl group, and $R^3$ and $R^4$ represent methyl group, and embodiments of formula [I] wherein $R^1$ and $R^2$ represent methyl group and at least one of $R^3$ and $R^4$ represents a group other than methyl group. The combinations are preferably different because the melting point of the polycarbonates can be low. Especially, the combinations are preferably such that the polycarbonates are liquid at room temperature (e.g., 25° C.) because they show improved workability during use. Further, such polycarbonates are also preferred in the sense that polyurethanes obtained by using them tend to have more improved weather resistance and heat aging resistance.

In the polycarbonates of the present invention, 90% or more of the terminal groups are hydroxyl groups. For use as starting materials of polyurethanes, they need to contain terminal hydroxyl groups that react with isocyanates to form urethanes.

The polycarbonates of the present invention preferably comprise 20 mol % or more of one or more types of repeating unit represented by formula [I] above among all repeating units to obtain polyurethanes having excellent weather resistance and heat resistance (especially heat aging resistance), more preferably 50 mol % or more of one or more types of repeating unit represented by formula [I] among all repeating units.

The range of the average molecular weight of the polycarbonates of the present invention is not limited, but they are typically used in the range of a number average molecular weight from 400 to 100000.

Especially, it is preferably 400 to 20000, more preferably 400 to 10000, even more preferably 400 to 8000. Still more preferably, it is 400 to 5000. Unless otherwise specified, the number average molecular weight as used herein refers to the value measured by the method using a nuclear magnetic resonance spectrometer described in the Examples later herein. It should be noted that when the instrument used in the Examples is not available since it is out of production or for other reasons, another instrument having equivalent performance can be used.

Further, the polycarbonates of the present invention preferably have a glass transition temperature of −20° C. or less, more preferably −30° C. or less as measured by differential scanning calorimetry to obtain polyurethanes having excellent flexibility, mechanical properties and the like. The lower limit of the glass transition temperature of the polycarbonates of the present invention is not specifically defined, but can be −60° C. or more, for example.

The polycarbonates of the present invention preferably have an exothermic melting peak temperature (melting point) of ° C. or less as measured by differential scanning calorimetry or have no exothermic melting peak observed, more preferably the polycarbonates have an exothermic melting peak temperature of 0° C. or less or have no exothermic melting peak observed (no crystallization observed). The lower limit of the exothermic melting peak temperature is not specifically defined, but can be −60° C. or more, for example.

Polycarbonates prepared from 1,6-hexanediol are commonly used as starting materials for polyurethanes, but 1,6-hexanediol has a melting point of about 46° C., which is higher than room temperature (25° C.) and may cause problems due to poor handling or poor processability such as non-homogeneity during reaction. In addition, they have a high tendency to crystallize so that soft segment moieties of polyurethanes prepared therefrom may readily cure by crystallization to impair elasticity and reduce recovery especially under cold conditions.

Crystalline polycarbonates having a high melting point among the polycarbonates of the present invention may cause problems due to similar disadvantages in some applications. For this reason, polycarbonates that are liquid at room temperature (e.g., 25° C.) are preferred among the polycarbonates of the present invention for some applications. The polycarbonates of the present invention that are liquid at room temperature include, for example, copolycarbonates comprising one or more types of repeating unit represented by formula [I] and a repeating unit represented by formula [II] below.

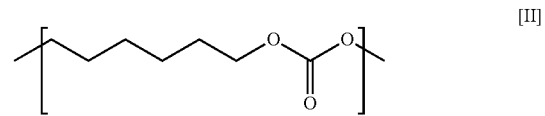

Among the copolycarbonates described above, preferred are copolycarbonates comprising 20 mol % or more of one or more types of repeating unit represented by formula [I] among all repeating units and also comprising a repeating unit represented by formula [II].

Such polycarbonates include copolycarbonates comprising 20 mol % to 80 mol % of a repeating unit of formula [I] wherein $R^1$, $R^2$, $R^3$ and $R^4$ represent methyl among all repeating units, or polycarbonates comprising a repeating unit of formula [I] wherein $R^1$ and $R^2$ represent methyl and at least one of $R^3$ and $R^4$ represents a group other than methyl.

The copolycarbonates comprising 20 mol % or more of one or more types of repeating unit represented by formula [I] among all repeating units and also comprising a repeating unit represented by formula [II] preferably include copolycarbonates comprising 20 mol % to 80 mol % of a repeating unit represented by formula [II] among all repeating units, more preferably copolycarbonates comprising 40 mol % to 80 mol % of one or more types of repeating unit represented by formula [I] among all repeating units and also comprising 60 mol % to 20 mol % of a repeating unit represented by formula [II]. Especially for use in polyurethane elastomers, preferred are copolycarbonates comprising 60 mol % to 80 mol % of one or more types of repeating unit represented by formula [I] among all repeating units and also comprising 40 mol % to 20 mol % of a repeating unit represented by formula [II] because they have various excellent and well-balanced properties.

According to the present invention, the polycarbonates can have a low glass transition temperature and can be liquid at room temperature (e.g., 25° C.) by incorporating a repeating unit represented by formula [II] as described above so that they are preferably used for various applications. Especially for industrial uses, polycarbonates that are liquid at room temperature are useful.

When the polycarbonates of the present invention are used to prepare polyurethane elastomers, the resulting elastomers containing polycarbonate moieties as soft segments have the advantage that they can be used in a wide temperature range if the polycarbonates used as the soft segment moieties have a low Tg. In other words, the polycarbonate moieties would be less likely to function as soft segments if the Tg of the polycarbonates were higher than the temperature at which the elastomers are practically used, but the polycarbonates of the present invention can be used for elastomers in a wide temperature range because they have a low Tg.

The polycarbonates of the present invention can have a Tg of −38° C. or less, even −40° C. or less, especially −42° C. or less by incorporating a repeating unit represented by formula [II]. The lower limit of Tg is not specifically defined, but can be −65° C. or more, even −55° C. or more, especially −50° C. or more, for example.

Further, the polycarbonates comprising a repeating unit represented by formula [II] can be polycarbonates having an exothermic melting peak temperature of 15° C. or less as measured by differential scanning calorimetry or no exothermic melting peak observed, or even they can be polycarbonates having an exothermic melting peak temperature of 0° C. or less or no exothermic melting peak observed.

Thus, the polycarbonates comprising one or more types of repeating unit represented by formula [I] and a repeating unit represented by formula [II] can achieve various performances based on the stability of the quaternary carbon atoms originally contained in the repeating unit represented by formula [I], and can also achieve desired performances by adjusting the copolymerization ratio of the repeating unit represented by formula [II].

The types of repeating units other than the repeating unit of formula [I] above used in the polycarbonates of the present invention are not specifically limited, and repeating units obtained from any diols that can be used as starting materials for polycarbonates can be used depending on required properties.

Examples of starting diols of repeating units other than the repeating unit of formula [I] above include aliphatic diols such as ethylene glycol, 1,2-propylene glycol, 1,3-propanediol, 1,3-butanediol, 2-methyl-1,3-propanediol, 1,3-pentanediol, 2,4-pentanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 2,5-hexanediol, 1,9-nonanediol, 2-methyl-1,8-octanediol, diethylene glycol, triethylene glycol, m-xylene glycol, p-xylylene glycol, polyethylene glycol, polypropylene glycol and polybutylene glycol; alicyclic diols such as 1,3-cyclohexanediol, 1,4-cyclohexanediol, 1,3-bis(hydroxymethyl)cyclohexane, 1,4-bis(hydroxymethyl)cyclohexane, 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclododecane dimethanol and 3,9-bis(1,1-dimethyl-2-hydroxyethyl)-2,4,8,10-tetraoxaspiro[5.5]undecane; alkylene oxide adducts of bisphenols such as 2,2-bis(4-hydroxyphenyl)propane (bisphenol A), bis(4-hydroxyphenyl)methane (bisphenol F), 1,1-bis(4-hydroxyphenyl)ethane, 1,1-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2-bis(3-methyl-4-hydroxyphenyl)propane, 1,1-bis(4-hydroxyphenyl)cyclohexane (bisphenol Z), 4,4'-dihydroxydiphenyl ether, 4,4'-dihydroxydiphenyl sulfide, 4,4'-dihydroxydiphenyl sulfoxide and 4,4'-dihydroxydiphenyl sulfone; alkylene oxide adducts of aromatic dihydroxy compounds such as hydroquinone, resorcin, 4,4'-dihydroxybiphenyl, 4,4'-dihydroxydiphenyl ether and 4,4'-dihydroxydiphenyl benzophenone; aromatic diols such as 2,2-bis(4-hydroxyphenyl)propane (bisphenol A), bis(4-hydroxyphenyl)methane (bisphenol F), 1,1-bis(4-hydroxyphenyl)ethane, 1,1-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2-bis(3-methyl-4-hydroxyphenyl)propane, 1,1-bis(4-hydroxyphenyl)cyclohexane (bisphenol Z), 4,4'-dihydroxydiphenyl ether, 4,4'-dihydroxydiphenyl sulfide, 4,4'-dihydroxydiphenyl sulfoxide, 4,4'-dihydroxydiphenyl sulfone, hydroquinone, resorcin, 4,4'-dihydroxybiphenyl, 4,4'-dihydroxydiphenyl ether and 4,4'-dihydroxydiphenyl benzophenone; and the like. Further, small amounts of repeating units derived from polyols having a functionality of 3 or more may also be contained. Examples of polyols having a functionality of 3 or more include glycerin, trimethylolethane, trimethylolpropane, ditrimethylolpropane, pentaerythritol and dipentaerythritol, and the like.

Among others, preferred are aliphatic diols such as ethylene glycol, 1,2-propylene glycol, 1,3-propanediol, 1,3-butanediol, 2-methyl-1,3-propanediol, 1,3-pentanediol, 2,4-pentanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 2,5-hexanediol, 1,9-nonanediol, 2-methyl-1,8-octanediol, diethylene glycol, triethylene glycol, m-xylylene glycol, p-xylylene glycol, polyethylene glycol, polypropylene glycol and polybutylene glycol, more preferably 1,3-propanediol, 2-methyl-1,3-propanediol, neopentyl glycol, 3-methyl-1,3-butanediol, 1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 1,9-nonanediol and 2-methyl-1,8-octanediol. Most preferred is 1,6-hexanediol.

The method for manufacturing the polycarbonates of the present invention is not specifically limited, and previously known methods can be applied. Typically, they can be prepared by transesterification between a diol compound and a carbonate ester.

For manufacturing the polycarbonates of the present invention, a diol compound represented by formula [III] below is used as a starting material. A derivative such as an ester may also be used depending on the preparation method.

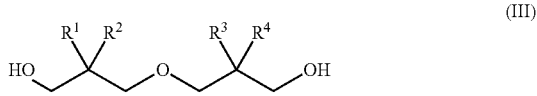

(III)

wherein $R^1$, $R^2$, $R^3$ and $R^4$ each independently represent an aliphatic hydrocarbon group containing 1 to 6 carbon atoms.

An example of an embodiment of a process for manufacturing a polycarbonate of the present invention comprises reacting a diol component containing one or more types of diol represented by formula [III] with a carbonate diester.

Preferably, examples of such an embodiment include a process for manufacturing a polycarbonate comprising reacting a diol component containing 80 mol % or more of one or more types of diol represented by formula [III] among all diols with a carbonate diester, and a process for manufacturing a polycarbonate comprising reacting a diol component containing 20 mol % or more of one or more types of diol represented by formula [III] among all diols and also containing 20 mol % to 80 mol % of 1,6-hexanediol among all diols with a carbonate diester.

As described above, the diol compound represented by formula [III] contains two quaternary carbon atoms in the diol chain. As a result, it is less likely to form a cyclic structure as compared with polycarbonates synthesized from 1,3-propanediols such as neopentyl glycol. Consequently, polycarbonates retaining approximately the initial ratio of starting materials can be obtained with little loss of the starting materials if a diol compound of formula [III] is copolymerized with a diol compound other than formula [III] such as 1,6-hexanediol as described in patent document 2, supra.

The method for manufacturing the diol compound represented by formula [III] is not specifically limited, but it can be obtained by, for example, reduction by hydrogenation of an acetal of formula [IV] below:

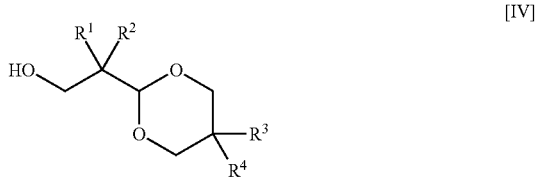

[IV]

wherein $R^1$, $R^2$, $R^3$ and $R^4$ each independently represent an aliphatic hydrocarbon group containing 1 to 6 carbon atoms. The acetal of formula [IV] can be obtained by acetalization of 2,2-disubstituted-3-hydroxypropanal and 2,2-disubstituted-1,3-propanediol as shown by formula [V] below:

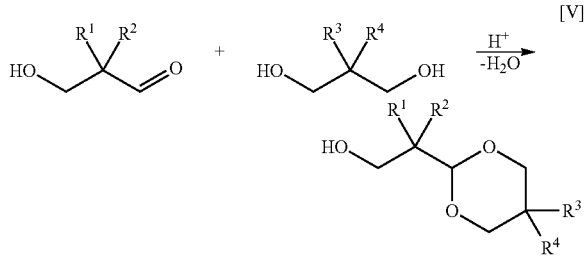

[V]

wherein $R^1$, $R^2$, $R^3$ and $R^4$ each independently represent an aliphatic hydrocarbon group containing 1 to 6 carbon atoms.

Carbonate esters used for manufacturing the polycarbonates of the present invention include alkylene carbonates, dialkyl carbonates, diaryl carbonates, and the like.

Alkylene carbonates include, for example, ethylene carbonate, trimethylene carbonate, 1,2-propylene carbonate, trimethylene carbonate, 1,2-butylene carbonate, 1,3-butylene carbonate, 1,2-pentylene carbonate, 5,5-dimethyl-1,3-dioxan-2-one, 5,5-diethyl-1,3-dioxan-2-one, 5-methyl-5-propyl-1,3-dioxan-2-one and 5-butyl-5-ethyl-1,3-dioxan-2-one, etc.

Further, dialkyl carbonates include, for example, dimethyl carbonate, diethyl carbonate and di-n-butyl carbonate, etc., and diaryl carbonates include, for example, diphenyl carbonate and the like.

Among these carbonate esters, preferably used are ethylene carbonate, dimethyl carbonate, diethyl carbonate, di-n-butyl carbonate and diphenyl carbonate.

The reaction temperature at which the polycarbonates of the present invention are prepared is 120° C. to 280° C. Preferably, it is 140° C. to 240° C.

If the reaction is to be accelerated during the preparation of the polycarbonates of the present invention, catalysts can be used. Catalysts include, for example, titanium compounds such as tetraisopropoxytitanium, tetra-n-butoxytitanium and the like; tin compounds such as di-n-butyltin dilaurate, di-n-butyltin oxide, dibutyltin diacetate and the like; metal acetate salts such as magnesium acetate, calcium acetate, zinc acetate, lead acetate and the like; metal alkoxides such as sodium methoxide, sodium ethoxide, potassium methoxide and the like, etc.

The polycarbonates containing terminal hydroxyl groups of the present invention are useful as starting materials for manufacturing polyurethanes. Thus, when a polyurethane is prepared by reacting a polymer containing terminal hydroxyl groups, a polyisocyanate and optionally a chain extender, the resulting polyurethane will contain a structural unit in which each one hydrogen atom has been removed from the terminal hydroxyl groups in the main chain if a polycarbonate of the present invention is used as at least a part of the polymer containing terminal hydroxyl groups. The polycarbonate of the present invention here desirably accounts for 20% by weight or more, more preferably 50% by weight or more of the polymer containing terminal hydroxyl groups.

Polymers containing terminal hydroxyl groups that can be used in combination with the polycarbonates of the present invention include those that can be used for the preparation of typical polyurethanes. For example, they include known polyesters containing terminal hydroxyl groups such as polytetramethylene adipate, polyethylene adipate, polyneopentylene adipate, polyhexamethylene adipate, polycaprolactone diol and the like; known polycarbonates such as polyalkylene carbonates containing 1,9-nonanediol or 1,6-hexanediol as an alkylene glycol component; known polyethers such as polyethylene glycol, polypropylene glycol, etc.

The method for manufacturing the polyurethanes of the present invention is not specifically limited, and previously known methods can be applied.

For example, the polyurethanes can be prepared by preheating a polycarbonate containing terminal hydroxyl groups to about 60° C. optionally after it is homogeneously mixed with a low molecular weight compound containing two or more active hydrogen atoms (a chain extender) and the like, then adding a polyisocyanate in such an amount that the molar ratio between the numbers of active hydrogen atoms and isocyanate groups in the mixture is 0.95 to 1:1.05, feeding the mixture to a continuous twin-screw polymerizer while stirring it for a short time in a rotary mixer, and continuously reacting it. Alternatively, the polyurethanes can be prepared by reacting a polycarbonate containing terminal hydroxyl groups with a polyisocyanate in advance to prepare a prepolymer containing terminal isocyanate groups, and then reacting the prepolymer with a chain extender.

In these preparation methods, it is also possible to use known polymerization catalysts represented by tertiary amines, organometallic salts such as organotin salts, organotitanium salts and the like. Further, these reactions are typically performed without solvent, but may also be performed in solvents preferably including, for example, dimethylformamide, diethylformamide, dimethylacetamide, dimethyl sulfoxide, tetrahydrofuran, methyl isobutyl ketone, dioxane, cyclohexanone, benzene, toluene, ethyl cellosolve and the like.

For manufacturing the polyurethanes of the present invention, compounds containing only one active hydrogen atom reactive with an isocyanate group can be used as chain terminators, e.g., monohydric alcohols such as ethyl alcohol and propyl alcohol; and secondary amines such as diethylamine and di-n-propylamine; and the like.

The polyurethanes desirably contain stabilizers such as heat stabilizers (e.g., antioxidants) or photostabilizers. Additionally, they may contain plasticizers, inorganic fillers, lubricants, colorants, silicone oils, foaming agents, flame retardants and the like.

Polyisocyanates include, for example, aromatic diisocyanates such as 4,4'-diphenylmethane diisocyanate, 2,4-tolylene diisocyanate, 2,6-tolylene diisocyanate, xylylene diisocyanate, and 1,5-naphthalene diisocyanate; alicyclic diisocyanates such as isophorone diisocyanate, dicyclohexylmethane diisocyanate, hydrogenated xylylene diisocyanate, and norbornene diisocyanate; aliphatic diisocyanates such as hexamethylene diisocyanate, and trimethylhexamethylene diisocyanate and the like; and these polyisocyanates may be used alone or as a combination of two or more of them. Among them, 4,4'-diphenylmethane diisocyanate is preferred. As used herein, the term "polyisocyanate" refers to a compound containing two or more isocyanate groups.

Chain extenders that can be used include low molecular weight compounds such as diols or diamines containing two or more active hydrogen atoms. Chain extenders include, for example, diols containing 2 to 10 carbon atoms such as ethylene glycol, propylene glycol, 1,4-butanediol, and 1,6-hexanediol; diamines containing 2 to 10 carbon atoms such as propylenediamine, and isophorone diamine and the like; and they may be used alone or as a combination of two or more of them. Polyurethanes are readily prepared when compounds containing two active hydrogen atoms such as diols and diamines are used as chain extenders.

The amount of the chain extenders to be used is not specifically limited, but preferably 0.1 to 20 times (molar ratio) the amount of the polycarbonates.

Additionally, low molecular weight monohydric alcohols such as methanol and ethanol; low molecular weight monovalent amines such as methylamine and ethylamine and the like may be used as modifiers, if desired.

The weight average molecular weight of the polyurethanes of the present invention is not specifically limited, but preferably 10,000 to 500,000. The number average molecular weight is not specifically limited, but preferably 10,000 to 100,000.

When the polymerization reaction is performed without solvent, the resulting polyurethane can be subjected to a molding process immediately after it has been polymerized. If 0.2% by weight or more of unreacted polyisocyanate exists in the polyurethane depending on polymerization conditions, it can be subjected to a molding process after it is aged at 60 to 80° C. for 4 to 30 hours as appropriate to complete the reaction.

When the polymerization reaction is performed in a solvent, the resulting polyurethane can be subjected to a molding process after it has been aggregated and precipitated by adding a poor solvent for the polyurethane, e.g., a saturated aliphatic hydrocarbon containing 6 to 10 carbon atoms such as hexane, heptane, octane, nonane or decane, or methanol, ethanol or the like, and then filtered off and dried.

The polyurethanes of the present invention comprise a repeating unit represented by formula [I]. The repeating unit represented by formula [I] is identical to the repeating unit represented by formula [I] described above, and also covers the same preferred ranges. The polyurethanes of the present invention may further comprise a repeating unit represented by formula [II] or other repeating units. In addition, diols or diamines containing two or more active hydrogen atoms can also be used as chain extenders. Especially when diamines are used as chain extenders, they can form urea bonds by a reaction with isocyanate groups to increase the molecular weight. Therefore, the polyurethanes of the present invention may contain urea bonds. Further, they can be more highly polymerized by forming a crosslinked structure via a reaction between urea bonds and isocyanate groups.

It should be noted that the polyurethanes of the present invention may comprise only one or more than one type of each of a repeating unit represented by formula [I] and a repeating unit represented by formula [II] and other repeating units.

An example of a preferred embodiment of a polyurethane of the present invention includes a polyurethane comprising a repeating unit represented by formula [X] below:

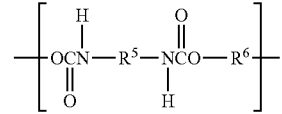

wherein $R^5$ represents a divalent hydrocarbon group, and $R^6$ contains a repeating unit represented by formula [I].

Examples of $R^5$ groups include a substituted or unsubstituted benzene ring, a substituted or unsubstituted cyclohexane ring, a substituted or unsubstituted straight-chain alkylene group containing 1 to 10 carbon atoms, and a combination thereof, wherein examples of substituents include alkyl groups, preferably methyl group or ethyl group.

Further, $R^5$ preferably represents the groups shown below, alone or as a combination thereof:

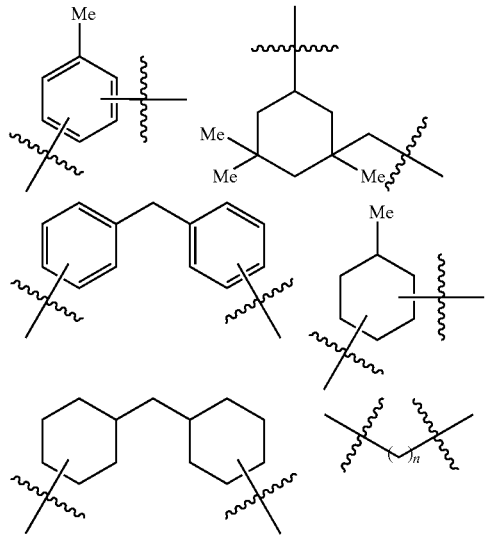

wherein Me represents methyl group, and n denotes an integer of 2 to 12.

In particular, $R^5$ preferably represents the group shown below:

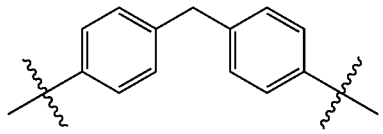 [SMILES: *c1ccc(Cc2ccc(*)cc2)cc1]

In the present embodiment, $R^6$ preferably consists substantially solely of a repeating unit represented by formula [I]. The term "substantially" means that, for example, 90% by weight or more, or even 95% by weight or more of the subcomponents of $R^6$ represent a repeating unit represented by formula [I].

In the present embodiment, the repeating unit represented by formula [X] above preferably accounts for 90% by weight or more of all repeating units contained in the polyurethane.

An example of another preferred embodiment of a polyurethane of the present invention includes a polyurethane comprising a repeating unit represented by formula [XX] below:

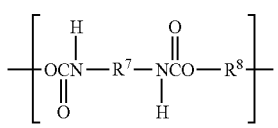

[XX]

wherein $R^7$ represents a divalent hydrocarbon group, and $R^8$ contains a repeating unit represented by formula [I] and a repeating unit represented by formula [II].

$R^7$ has the same meaning as defined for $R^5$ above, and also covers the same preferred ranges.

In the present embodiment, $R^8$ preferably consists substantially solely of a repeating unit represented by formula [I] and a repeating unit represented by formula [II]. The term "substantially" means that, for example, 90% by weight or more, or even 95% by weight or more of the subcomponents of $R^8$ represent a repeating unit represented by formula [I] or a repeating unit represented by formula [II].

In the present embodiment, the repeating unit represented by formula [XX] above preferably accounts for 90% by weight or more of all repeating units contained in the polyurethane.

The proportions of the repeating unit represented by formula [I] (repeating unit XX-1) and the repeating unit represented by formula [II] (repeating unit XX-2) in $R^8$ of the repeating unit represented by formula [XX] here are preferably 20 mol % to 80 mol % of repeating unit XX-1 and 80 mol % to 20 mol % of repeating unit XX-2, more preferably 40 mol % to 80 mol % of repeating unit XX-1 and 60 mol % to 20 mol % of repeating unit XX-2.

An example of another embodiment of a polyurethane of the present invention includes a polyurethane comprising at least one of a repeating unit represented by formula [X] and a repeating unit represented by formula [XX], as well as a repeating unit represented by formula [XXX]:

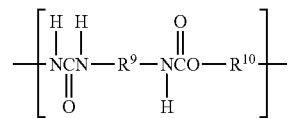

[XXX]

wherein $R^9$ represents a divalent hydrocarbon group, and $R^{10}$ has the same meaning as defined for $R^6$ in formula [X] or $R^8$ in formula [XX].

$R^9$ each has the same meaning as defined for $R^5$ in formula [X], and also covers the same preferred ranges.

Such structures are obtained when diamines are used as chain extenders.

In the present embodiment, the repeating units represented by formulae [X] to [XXX] above preferably account for 90% by weight or more of all repeating units contained in the polyurethane.

The polyurethanes of the present invention can be molded by various methods including, for example, extrusion molding, injection molding, calendering, blow molding and the like.

The polycarbonates of the present invention have excellent weather resistance and heat resistance (especially heat aging resistance) so that when they are used as starting materials for manufacturing polyurethanes and the like, the resulting products have excellent weather resistance, heat resistance (especially heat aging resistance) and the like. Further, the polycarbonates obtained by the present invention can also be applied for various other purposes.

The polyurethanes of the present invention retain excellent properties such as flexibility, hydrolysis resistance, mechanical properties and the like, and particularly have excellent weather resistance and heat resistance (especially heat aging resistance) so that they can be applied for polyurethane elastomers, paints, adhesives, coatings, foams, binders, elastic fibers, synthetic leathers, artificial leathers, sealing materials, waterproofing materials, flooring materials and the like.

The polycarbonates of the present invention can also be used as polymer modifiers, polymer plasticizers and the like.

EXAMPLES

The following Examples and Comparative examples further illustrate the preparation processes of the present invention, but the present invention is not limited to these examples without departing from the spirit of the invention.

The following Examples are not construed to limit the present invention. The characteristics and the like of the polycarbonates were determined by the following methods.
(1) Hydroxyl Value The hydroxyl value of each polycarbonate was determined according to JIS K 1557.

Further, the average of the number of hydroxyl groups per molecule of the polycarbonate P was calculated from the measured hydroxyl value and the measured number average molecular weight (Mn) of the polycarbonate described below.

Hydroxyl value (mgKOH/g)×10$^{-3}$=[molecular weight of KOH×the average of the number of OH groups per molecule of the polycarbonate P]/(Mn of the polycarbonate)

P=[hydroxyl value (mgKOH/g)×Mn]/(56.1×10$^3$)

(2) Number Average Molecular Weight and Copolymerization Molar Ratio of Copolycarbonates The number average molecular weight (Mn) of each polycarbonate and the copolymerization molar ratio of each copolycarbonate were determined by measuring the nuclear magnetic resonance of protons in a deuterated chloroform solvent using a nuclear magnetic resonance spectrometer from JEOL (model: JNM-ECA500). Mn was determined by using the integral for the methylene proton signals adjacent to the terminal groups of the molecule and for the methylene proton signals adjacent to the carbonate bonds. The copolymerization ratio was determined from the integral for the methylene proton signals of each monomer.

(3) Glass Transition Temperature and Melting Point

The glass transition temperature (Tg) and melting point (Tm) of each polycarbonate were determined on about 10 mg of each sample in a non-hermetic aluminum pan using a differential scanning calorimeter from SHIMADZU CORPORATION (model: DSC/TA-60WS) at a heating rate of 10° C./min under a nitrogen gas flow (30 ml/min).

Further, the physical properties and the like of the polyurethanes were determined by the following methods.

(1) Molecular Weight

The molecular weight of each polyurethane was determined using a GPC system from Showa Denko K.K. (model: pump: Shodex DS-4; columns: Shodex GPC KD-806M×2+KD-802+KD-G) with an RI detector (model: Shodex RI-101) in N,N'-dimethylformamide as a solvent. The number average molecular weight (Mn) and weight average molecular weight (Mw) were determined using polyethylene oxide standards.

(2) Tensile Properties

Tensile tests (tensile breaking stress and tensile breaking strain) of each polyurethane were performed on 5 A test specimens at 60° C. according to JIS K 7162 using a material testing system from Instron (model: 5582).

(3) Chromaticity

The chromaticity of each polyurethane was determined on a sheet of 1 mm in thickness in transmission mode according to JIS K 7105 using a colorimeter from NIPPON DENSHOKU INDUSTRIES CO., LTD. (model: ZE-2000), and reported as yellowness in b* value (CIE 1976).

(4) Weather Resistance

Test specimens of each polyurethane were treated according to JIS K 6266 for 250 hours using a dew cycle sunshine weather meter from Suga Test Instruments Co., Ltd. (model: S80DHBBR), and then analyzed for tensile properties and chromaticity. Tensile properties were reported as the retention rate (in %) of the initial physical properties.

(5) Heat Aging Resistance

Test specimens were treated according to JIS K 7212 at 120° C. for 285 hours using a GEER type heat aging oven from Toyo Seiki Seisaku-sho, Ltd. (model: GO-01), and then analyzed for chromaticity.

Reference Example 1

Synthesis of 3,3'-oxybis(2,2-dimethylpropan-1-ol) (Formula [VI])

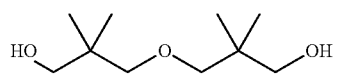

[VI]

(1) Preparation of 2-(5,5-dimethyl-1,3-dioxan-2-yl)-2-methylpropan-1-ol (Acetalization)

In a 2-liter round-bottomed flask, 131.3 g of 2,2-dimethyl-3-hydroxypropionaldehyde (hydroxypivalaldehyde from MITSUBISHI GAS CHEMICAL COMPANY, INC., purity 99.8%), 136.0 g of 2,2-dimethyl-1,3-propanediol (neopentyl glycol, reagent grade from Tokyo Chemical Industry Co., Ltd.), 705 g of benzene, and 3.0 g of Nafion beads (brand name "NR-50" from Sigma-Aldrich Corporation) were reacted at ambient pressure while the water produced was removed out of the system by azeotropic distillation with benzene using a Dean-Stark trap until no more water was collected. The reaction mixture was filtered, and then concentrated and recrystallized by cooling to give crystals of 2-(5,5-dimethyl-1,3-dioxan-2-yl)-2-methylpropan-1-ol.

(2) Preparation of a Catalyst Support

Zirconium oxide used as a support for metal components was prepared by the procedure as follows:

To 505 g of a stirred aqueous zirconium oxynitrate solution at a concentration of 25% by mass expressed as the content of zirconium oxide ($ZrO_2$) was added dropwise 15.5 g of 28% aqueous ammonia to give a white precipitate. This was filtered and washed with ion-exchanged water, and then dried at 110° C. for 10 hours to give a zirconium oxide hydrate. This was placed in a porcelain crucible and baked in air at 400° C. for 3 hours in an electric furnace, and then ground in an agate mortar to give a zirconium oxide powder (hereinafter designated as "support A"). Support A had a BET specific surface area of 102.7 $m^2/g$ (measured by nitrogen adsorption; the same method was applied in the following examples).

(3) Preparation of a Catalyst

To 50 g of support A was added an aqueous solution of 0.66% by mass of palladium chloride and 0.44% by mass of sodium chloride, whereby metal components were adsorbed onto the support. To this was poured an aqueous solution of formaldehyde and sodium hydroxide to instantly reduce the adsorbed metal components. Then, the catalyst was washed with ion-exchanged water and dried to prepare a catalyst containing 2.0% by mass of palladium supported on zirconium oxide (hereinafter designated as "catalyst A").

(4) Reduction by Hydrogenation of 2-(5,5-dimethyl-1,3-dioxan-2-yl)-2-methylpropan-1-ol A 500-mL SUS reaction vessel was charged with 6.00 g of catalyst A, 24.0 g of 2-(5,5-dimethyl-1,3-dioxan-2-yl)-2-methylpropan-1-ol, and 240 g of 1,4-dioxane, and the reaction vessel was purged with nitrogen gas. Then, the reaction vessel was charged with hydrogen gas up to 8.5 MPa, and heated to the reaction temperature 230° C., and the mixture was reacted for 5 hours while the internal pressure of the reaction vessel was maintained at 13 MPa. Then, the reaction vessel was cooled and the contents of the reaction vessel were collected. The resulting reaction solution was filtered to separate the catalyst, and then recrystallized to give 3,3'-oxybis(2,2-dimethylpropan-1-ol). The structure of the resulting product was confirmed by NMR analysis.

$^1$H NMR (500 MHz, CDCl$_3$) δ 0.91 (3H×4, 2s, Me$_2$C×2), 2.50-2.68 (2H, bs, OH×2), 3.26 (4H, s, —CH$_2$—O—×2), 3.43 (4H, s, —CH$_2$OH×2); $^{13}$C NMR (125 MHz, CDCl$_3$) δ 21.8, 36.4, 70.8, 79.7.

The necessary amount for the Examples was provided by repeating the reaction.

Reference Example 2

Synthesis of 2-ethyl-2-((3-hydroxy-2,2-dimethyl-propoxy)methyl)hexan-1-ol (Formula [VII])

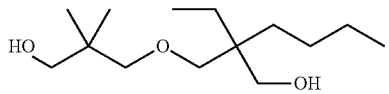

[VII]

In a 2-L round-bottomed flask, 73.6 g of 2,2-dimethyl-3-hydroxypropanal (hydroxypivalaldehyde from MITSUBISHI GAS CHEMICAL COMPANY, INC., purity 99.8%), 111.8 g of 2-butyl-2-ethyl-1,3-propanediol (reagent grade from Tokyo Chemical Industry Co., Ltd.), 705 g of benzene and 3.0 g of Nafion beads (brand name "NR-50" from Sigma-Aldrich Corporation) were reacted at ambient pressure while the water produced was removed out of the system by azeotropic distillation with benzene using a Dean-Stark trap until no more water was collected. The reaction mixture was filtered, concentrated, and then distilled under reduced pressure to give 2-(5-butyl-5-ethyl-1,3-dioxan-2-yl)-2-methylpropan-1-ol.

A 500-mL SUS reaction vessel was charged with 6.0 g of catalyst A of Reference example 1, 24.0 g of 2-(5-butyl-5-ethyl-1,3-dioxan-2-yl)-2-methylpropan-1-ol, and 240 g of 1,4-dioxane, and the reaction vessel was purged with nitrogen gas. Then, the reaction vessel was charged with hydrogen gas up to 8.5 MPa, and heated to the reaction temperature 230° C., and the mixture was reacted for 5 hours while the internal pressure of the reaction vessel was maintained at 13 MPa. Then, the reaction vessel was cooled and the contents of the reaction vessel were filtered to separate the catalyst, and then distilled under reduced pressure and purified to give the desired product. The structure of the resulting product was confirmed by NMR analysis.

$^1$H NMR (500 MHz, CDCl$_3$) δ 0.81 (3H, t, CH$_3$CH$_2$CH$_2$—), 0.90 (9H, m, Me$_2$C×2 & CH$_3$CH$_2$C), 1.10-1.38 (8H, m, CH$_3$CH$_2$CH$_2$CH$_2$— & CH$_3$CH$_2$C), 2.60 (1H, bs, OH), 2.68 (1H bs, OH) 3.24, 3.30 (2H×2, 2s, —CH$_2$—O—×2), 3.41, 3.47 (2H×2, 2s, —CH$_2$OH×2); $^{13}$C NMR (125 MHz, CDCl$_3$) δ 7.3, 14.1, 21.8, 23.5, 23.6, 25.0, 30.4, 36.4, 41.0, 67.9, 70.6, 79.4, 79.5.

The necessary amount for the Examples was provided by repeating the reaction.

Reference Example 3

Synthesis of 2-ethyl-2-((3-hydroxy-2,2-dimethyl-propoxy)methyl)butan-1-ol (Formula [VIII])

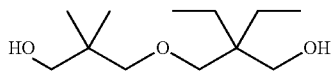

[VIII]

Acetalization reaction and purification were performed by the same procedure as in Reference example 1 except that 2,2-diethyl-1,3-propanediol (reagent grade from Tokyo Chemical Industry Co., Ltd.) was used in place of 2,2-dimethyl-1,3-propanediol to give crystals of 2-(5,5-diethyl-1,3-dioxan-2-yl)-2-methylpropan-1-ol.

Reduction reaction by hydrogenation and purification were performed by the same procedure as in Reference example 2 except that 2-(5,5-diethyl-1,3-dioxan-2-yl)-2-methylpropan-1-ol was used in place of 2-(5-butyl-5-ethyl-1,3-dioxan-2-yl)-2-methylpropan-1-ol to give the desired product. The structure of the product was confirmed by NMR analysis.

$^1$H NMR (500 MHz, CDCl$_3$) δ 0.81 (3H×2, 2t, CH$_3$CH$_2$—×2), 0.90 (3H×2, 2s, Me$_2$C×2), 1.29 (2H×2, 2q, CH$_3$CH$_2$C), 2.62-2.80 (2H, bs, OH×2), 3.24, 3.30 (2H×2, 2s, —CH$_2$—O—×2), 3.41, 3.47 (2H×2, 2s, —CH$_2$OH×2); $^{13}$C NMR (125 MHz, CDCl$_3$) δ 7.22, 21.8, 22.9, 36.3, 41.0, 67.4, 70.5, 76.6, 79.4.

The necessary amount for the Examples was provided by repeating the reaction.

Reference Example 4

Synthesis of 2-((3-hydroxy-2,2-dimethylpropoxy)methyl)-2-methylpentan-1-ol (Formula [IX])

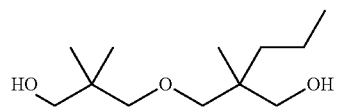

[IX]

Synthesis and reduction reaction by hydrogenation of an acetal compound, and purification were performed by the same procedure as in Reference example 2 except that 2-methyl-2-propyl-1,3-propanediol (reagent grade from Tokyo Chemical Industry Co., Ltd.) was used in place of 2-butyl-2-ethyl-1,3-propanediol to give the desired product. The structure of the product was confirmed by NMR analysis.

$^1$H NMR (500 MHz, CDCl$_3$) δ 0.83 (3H, s, CH$_3$C), δ 0.91 (3H×3, 3s, Me$_2$C×2 & CH$_3$CH$_2$—), 1.20-1.38 (4H, m, CH$_3$CH$_2$CH$_2$—), 2.68-2.84 (2H, bs, OH×2), 3.21-3.30 (4H, m, —CH$_2$—O—×2), 3.41-3.45 (4H, m, —CH$_2$OH×2); $^{13}$C NMR (125 MHz, CDCl$_3$) δ 15.0, 16.5, 19.0, 21.8, 36.4, 37.0, 38.9, 69.7, 70.6, 78.4, 79.5.

The necessary amount for the Examples was provided by repeating the reaction.

Example 1

A reaction vessel having an internal volume of 1.6 L and equipped with a paddle stirrer, a cold trap, a thermometer, a heater and a nitrogen gas inlet was charged with 321.3 g (1.50 mol) of diphenyl carbonate (from Mitsubishi Chemical Corporation), 371.1 g (1.95 mol) of 3,3'-oxybis(2,2-dimethylpropan-1-ol) obtained in Reference example 1, and 6.4 mg (0.02 mmol) of magnesium acetate tetrahydrate (reagent grade from Wako Pure Chemical Industries, Ltd.), and purged with nitrogen gas, after which a transesterification reaction was performed at 190° C. for 1 hour in a nitrogen atmosphere while the temperature was gradually raised, and then depressurization was started and the reaction was performed for 4 hours at 80 to 27 kPa and 190° C. to 205° C. while phenol was removed outside of the system as the pressure was gradually lowered and the temperature was raised. Then, heating and depressurization were gradually proceeded for 2 hours until 220° C. and 1.2 kPa were finally reached while phenol and the diol component were further removed outside of the system. Once the target molecular weight was reached as judged from the amount of the distillate, the reaction was terminated to give polycarbonate (1). Characteristics and physical properties of the resulting polycarbonate are shown in Table 1.

Example 2

The same procedure as in Example 1 was performed, and then the reaction was further continued. The reaction was performed at a pressure of 0.1 kPa and 220 to 265° C. for 13 hours, and once the viscosity increased, the reaction was terminated to give a polycarbonate. Characteristics and physical properties of the resulting polycarbonate are shown in Table 1.

Example 3

A polycarbonate (2) was obtained by the same procedure as in Example 1 except that 2-ethyl-2-((3-hydroxy-2,2-dimethylpropoxy)methyl)hexan-1-ol obtained in Reference example 2 was used as a starting diol. Characteristics and physical properties of the resulting polycarbonate are shown in Table 1.

Example 4

A polycarbonate was obtained by the same procedure as in Example 1 except that 2-ethyl-2-((3-hydroxy-2,2-dimethylpropoxy)methyl)butan-1-ol obtained in Reference example 3 was used as a starting diol. Characteristics and physical properties of the resulting polycarbonate are shown in Table 1.

Example 5

A polycarbonate was obtained by the same procedure as in Example 1 except that 2-((3-hydroxy-2,2-dimethylpropoxy)methyl)-2-methylpentan-1-ol obtained in Reference example 4 was used as a starting diol. Characteristics and physical properties of the resulting polycarbonate are shown in Table 1.

Example 6

A polycarbonate (3) was obtained by the same procedure as in Example 1 except that a mixture of 3,3'-oxybis(2,2-dimethylpropan-1-ol) and 1,6-hexanediol (molar ratio 74/26) was used as a starting diol. Characteristics and physical properties of the resulting polycarbonate are shown in Table 1.

Example 7

A polycarbonate was obtained by the same procedure as in Example 1 except that a mixture of 3,3'-oxybis(2,2-dimethylpropan-1-ol) and 1,6-hexanediol (molar ratio 53/47) was used as a starting diol. Characteristics and physical properties of the resulting polycarbonate are shown in Table 1.

Example 8

A polycarbonate was obtained by the same procedure as in Example 1 except that a mixture of 3,3'-oxybis(2,2-dimethylpropan-1-ol) and 2-ethyl-2-((3-hydroxy-2,2-dimethylpropoxy)methyl)hexan-1-ol (molar ratio 78/22) was used as a starting diol. Characteristics and physical properties of the resulting polycarbonate are shown in Table 1.

Example 9

A polycarbonate was obtained by the same procedure as in Example 1 except that a mixture of 2-ethyl-2-((3-hydroxy-2,2-dimethylpropoxy)methyl)hexan-1-ol and 1,6-hexanediol (molar ratio 20/80) was used as a starting diol. Characteristics and physical properties of the resulting polycarbonate are shown in Table 1.

Comparative Example 1

A polycarbonate (4) was obtained by the same procedure as in Example 1 except that 1,6-hexanediol was used as a starting diol. Characteristics and physical properties of the resulting polycarbonate are shown in Table 1.

TABLE 1

|  | Starting diol*1 (initial molar ratio) | Copolymerization molar ratio | Tg (° C.) | Tm*2 (° C.) | Hydroxyl value (mgKOH/g) | Mn | P |
|---|---|---|---|---|---|---|---|
| Example 1 | dNG | — | −36 | 64 | 109 | 1040 | 2.02 |
| Example 2 | dNG | — | −24 | 73 | 6 | 18200 | 1.95 |
| Example 3 | NBG | — | −34 | — | 110 | 1030 | 2.02 |
| Example 4 | NVG | — | −35 | — | 106 | 1060 | 2.00 |
| Example 5 | NMG | — | −36 | — | 121 | 930 | 2.01 |
| Example 6 | dNG/HD(74/26) | dNG/HD:72/28 | −42 | −5 | 118 | 950 | 2.00 |
| Example 7 | dNG/HD(53/47) | dNG/HD:50/50 | −47 | — | 114 | 980 | 1.99 |
| Example 8 | dNG/NBG(80/20) | dNG/NBG:78/22 | −34 | — | 125 | 900 | 2.01 |
| Example 9 | NBG/HD(20/80) | NBG/HD:21/79 | −49 | 13 | 69 | 1630 | 2.00 |
| Comparative example 1 | HD | — | −67 | 38 | 104 | 1120 | 2.08 |

*1dNG: 3,3'-oxybis(2,2-dimethylpropan-1-ol)
NBG: 2-ethyl-2-((3-hydroxy-2,2-dimethylpropoxy)methyl)hexan-1-ol
NVG: 2-ethyl-2-((3-hydroxy-2,2-dimethylpropoxy)methyl)butan-1-ol
NMG: 2-((3-hydroxy-2,2-dimethylpropoxy)methyl)-2-methylpentan-1-ol
HD: 1,6-hexanediol
*2No crystallization observed.

As shown above, the number of OH groups per polycarbonate molecule P calculated from the measured hydroxyl value and Mn was 1.95 or more. Since the maximum theoretical number of terminal OH groups per polycarbonate molecule is 2, it was shown that 97.5% or more of terminal groups were hydroxyl groups.

Further, no crystallization was observed in Examples 3 to 5 using repeating units represented by formula [I] wherein the combination of $R^1$ and $R^2$ and the combination of $R^3$ and $R^4$ are different from each other, and the polycarbonates of Examples 3 to 9 were liquid at room temperature (e.g., ° C.), indicating that these examples are more preferred for some applications.

Comparative Example 3

A polycarbonate was synthesized by the same procedure as in Example 1 except that neopentyl glycol (from MITSUBISHI GAS CHEMICAL COMPANY, INC.) was used as a starting diol.

The resulting carbonate had a number average molecular weight of about 1370 as determined by the method described above (NMR), but the molecular weight was determined to be about 670 by Gel Permeation Chromatography (GPC, measured in tetrahydrofuran as a solvent using an RI detector and calibrated with polystyrene standards). Further, cyclic carbonate compounds were found in the resulting carbonate.

In contrast, the number average molecular weights of the polycarbonates of Examples 1 to 9 were determined by GPC in the same manner as described above to find that they were almost equal to the number average molecular weights calculated from NMR data.

This result was assumed to reflect the fact that when neopentyl glycol was used as a diol component, it was consumed to produce carbonate compounds having a stable cyclic structure during polycondensation, whereby the proportion of the desired straight-chain polycarbonate in the product decreased.

(Synthesis of Polyurethanes)

Example 10

A 500 ml-flask equipped with a paddle stirrer and a nitrogen gas inlet was charged with 142.4 g of polycarbonate (1) obtained in Example 1, and water was removed under reduced pressure at 80° C. for 2 hours, and then 57.6 g of methylenediphenyl 4,4'-diisocyanate was added and the mixture was reacted for 2 hours to prepare a prepolymer. Then, 10.1 g of 1,4-butanediol was added as a chain extender, and removed after a few minutes when the viscosity increased. About 200 g of the resulting product was placed in a mixer from Brabender GmbH & Co., KG (brand name: Plasti-Corder® Lab-Station), and kneaded at 160° C., rpm for 10 minutes. The resulting polyurethane was compression-molded into a sheet using a hydraulic molding machine from Toho Press Manufacturing, Ltd., and then cut to prepare test specimens. The evaluation results of the resulting test specimens are shown in Table 2.

Example 11

A polyurethane was prepared by the same procedure as in Example 10 except that the polycarbonate (2) obtained in Example 3 was used in place of the polycarbonate (1). The evaluation results of the resulting polyurethane are shown in Table 2.

Example 12

A polyurethane was prepared by the same procedure as in Example 10 except that the polycarbonate (3) obtained in Example 6 was used in place of the polycarbonate (1). The evaluation results of the resulting polyurethane are shown in Table 2.

Comparative Example 2

A polyurethane was prepared by the same procedure as in Example 10 except that the polycarbonate (4) obtained in Comparative example 1 was used in place of the polycarbonate (1). The evaluation results of the resulting polyurethane are shown in Table 2.

TABLE 2

|  |  |  | Initial properties | | | Weather resistance test (250 h) | | | Heat aging resistance test (285 h) Chromaticity b* |
|---|---|---|---|---|---|---|---|---|---|
|  | Mn | Mw | Chromaticity b* | Tensile breaking stress (MPa) | Tensile breaking strain (%) | Chromaticity b* | Retention rate of tensile breaking stress (%) | Retention rate of tensile breaking strain (%) |  |
| Example 10 | 45000 | 92000 | 8 | 20 | 850 | 28 | 43 | 60 | 44 |
| Example 11 | 46000 | 98000 | 15 | 19 | 990 | 28 | 44 | 54 | 22 |
| Example 12 | 54000 | 120000 | 4 | 20 | 950 | 27 | 60 | 69 | 18 |
| Comparative example 2 | 59000 | 140000 | 10 | 37 | 740 | 32 | 32 | 58 | 53 |

The polyurethanes obtained from the polycarbonates of the present invention showed high retention rates of tensile breaking stress and less discoloration in the weather resistance test, as well as less discoloration in the heat aging resistance test, proving that they are superior to Comparative example in weather resistance and heat aging resistance. Particularly, a comparison between Example 10 and Example 11 showed that higher weather resistance (especially chromaticity) and heat aging resistance can be achieved by using a repeating unit represented by formula [I] wherein the combination of $R^1$ and $R^2$ and the combination of $R^3$ and $R^4$ are different from each other.

INDUSTRIAL APPLICABILITY

When the polycarbonates of the present invention are used as starting materials for manufacturing polyurethanes, the resulting products have excellent weather resistance, heat resistance and the like. They also can be used as component materials of paints, adhesives, pressure-sensitive adhesives, inks, covering materials, encapsulants and the like; as well as polymer modifiers, polymer plasticizers and the like. Further, the polyurethanes of the present invention retain excellent properties such as flexibility, hydrolysis resistance, mechanical properties and the like, and also have excellent weather resistance and heat resistance (especially heat aging resistance) so that they can be applied for polyurethane elastomers, paints, adhesives, coatings, foams, binders, elastic fibers, synthetic leathers, artificial leathers, sealing materials, waterproofing materials, flooring materials and the like.

What is claimed is:

1. A polycarbonate, comprising:
one or more types of repeating unit of formula [I], where 90% or more of a terminal group thereof is hydroxyl group,

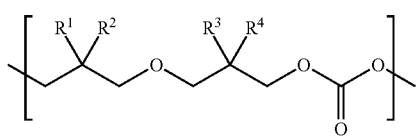

[I]

wherein $R^1$, $R^2$, $R^3$ and $R^4$ each independently represent an aliphatic hydrocarbon group containing 1 to 6 carbon atoms.

2. The polycarbonate according to claim 1, wherein, in the repeating unit of the formula [I], a combination of $R^1$ and $R^2$ is different from a combination of $R^3$ and $R^4$.

3. The polycarbonate according to claim 1, wherein the one or more types of the repeating unit of the formula [I] is contained at a ratio of 20 mol % or more among all repeating units.

4. The polycarbonate according to claim 1, having a number average molecular weight of 400 to 10000.

5. The polycarbonate according to claim 4, having a glass transition temperature of −30° C. or less as measured by differential scanning calorimetry.

6. The polycarbonate according to claim 1, wherein the one or more types of the repeating unit of the formula [I] is contained at a ratio of 50 mol % or more among all repeating units.

7. The polycarbonate according to claim 1, further comprising:
a repeating unit of formula [II],

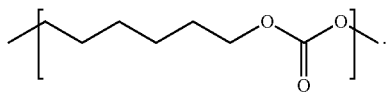

[II]

8. The polycarbonate according to claim 7, wherein the one or more types of the repeating unit of the formula [I] is contained at a ratio of 20 mol % or more among all repeating units, and the repeating unit of the formula [II] is contained at a ratio of 20 mol % to 80 mol % among all repeating units.

9. The polycarbonate according to claim 7, having an exothermic melting peak temperature of 15° C. or less as measured by differential scanning calorimetry, or having no exothermic melting peak observed.

10. The polycarbonate according to claim 1, wherein $R^1$ and $R^2$ represent methyl group in the formula [I].

11. The polycarbonate according to claim 10, wherein $R^3$ and $R^4$ represent methyl group in the formula [I].

12. The polycarbonate according to claim 10, wherein at least one of $R^3$ and $R^4$ represents a group other than methyl group in the formula [I].

13. The polycarbonate according to claim 3, wherein the one or more types of repeating unit comprises a repeating unit of the formula [I], where $R^1$, $R^2$, $R^3$ and $R^4$ represent methyl group, contained at a ratio of 20 mol % to 80 mol % among all repeating units, and a repeating unit of the formula [I], where a combination of $R^1$ and $R^2$ is different from a combination of $R^3$ and $R^4$, contained at a ratio of 20 mol % or more among all repeating units.

14. The polycarbonate according to claim 13, having an exothermic melting peak temperature of 15° C. or less as measured by differential scanning calorimetry or having no exothermic melting peak observed.

15. A polyurethane obtained by reacting the polycarbonate of claim 1 with a polyisocyanate.

16. An elastomer comprising the polyurethane of claim 15.

17. A process for manufacturing a polycarbonate having 90% or more terminal hydroxyl groups, comprising:
reacting, with a carbonate diester, a diol component containing one or more types of diol of formula [III],

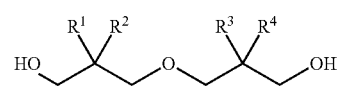

[III]

wherein $R^1$, $R^2$, $R^3$ and $R^4$ each independently represent an aliphatic hydrocarbon group containing 1 to 6 carbon atoms.

18. The process for manufacturing a polycarbonate according to claim 17, comprising:
reacting a diol component containing 20 mol % or more of one or more types of diol of the formula [III] among all diols and containing 20 mol % to 80 mol % of 1,6-hexanediol among all diols with a carbonate diester.

19. A process for manufacturing a polyurethane, comprising:
reacting the polycarbonate of claim 1 with a polyisocyanate.

20. The process for manufacturing a polyurethane according to claim 19, comprising:
reacting the polycarbonate with a polyisocyanate to give a prepolymer; and
reacting the prepolymer with a chain extender.

21. A polyurethane, comprising:
urethane bonds; and
a repeating unit of formula [I],

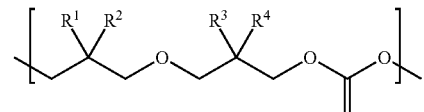

[I]

wherein $R^1$, $R^2$, $R^3$ and $R^4$ each independently represent an aliphatic hydrocarbon group containing 1 to 6 carbon atoms.

* * * * *